United States Patent
Choi et al.

(10) Patent No.: US 8,266,341 B2
(45) Date of Patent: Sep. 11, 2012

(54) DISPLAY APPARATUS, CONTROL METHOD THEREOF AND CONTROL METHOD OF EXTERNAL DEVICE

(75) Inventors: Seung-hyuk Choi, Suwon-si (KR); Seung-seop Shim, Anyang-si (KR); Moon-seok Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 12/369,884

(22) Filed: Feb. 12, 2009

(65) Prior Publication Data

US 2009/0248914 A1  Oct. 1, 2009

(30) Foreign Application Priority Data

Mar. 31, 2008 (KR) ............ 10-2008-0029649

(51) Int. Cl.
*G06F 13/00* (2006.01)
(52) U.S. Cl. .................................................. 710/33
(58) Field of Classification Search ............... 710/33
See application file for complete search history.

(56) References Cited

U.S. PATENT DOCUMENTS

| | | | |
|---|---|---|---|
| 2002/0194474 A1* | 12/2002 | Natsuno et al. | 713/168 |
| 2003/0071115 A1* | 4/2003 | Horn et al. | 235/379 |
| 2004/0024580 A1* | 2/2004 | Salmonsen et al. | 703/27 |
| 2004/0143624 A1 | 7/2004 | Kusano et al. | |
| 2005/0186988 A1 | 8/2005 | Lim et al. | |
| 2007/0067808 A1* | 3/2007 | DaCosta | 725/62 |
| 2008/0114650 A1* | 5/2008 | Ku | 705/14 |
| 2008/0155674 A1* | 6/2008 | Hong | 726/7 |
| 2012/0028568 A1 | 2/2012 | Lim et al. | |
| 2012/0028569 A1 | 2/2012 | Lim et al. | |
| 2012/0030719 A1 | 2/2012 | Lim et al. | |
| 2012/0030720 A1 | 2/2012 | Lim et al. | |

FOREIGN PATENT DOCUMENTS

| | | |
|---|---|---|
| EP | 1248188 A1 | 10/2002 |
| EP | 1376572 A2 | 1/2004 |
| WO | 03/073229 A2 | 9/2003 |

OTHER PUBLICATIONS

Communication from the European Patent Office dated Mar. 9, 2011, in Application No. 09153295.2.
Summon to Attend Oral Proceedings issued Aug. 5, 2011 by the European Patent Office in corresponding European Patent Application No. 09153295.2.
European Office Action issued Sep. 22, 2010 in corresponding European Patent Application No. 09153295.2.

(Continued)

*Primary Examiner* — Henry Tsai
*Assistant Examiner* — Juanito Borromeo
(74) *Attorney, Agent, or Firm* — Sughrue Mion, PLLC

(57) ABSTRACT

A display apparatus, a control method thereof and a control method of an external device are provided. The display apparatus includes a contents processing unit which reproduces contents, a communication unit which communicates with an external device which reproduces contents, and a control unit which receives reproduction information of the contents reproduced in the external device from the external device through the communication unit, and controls the contents processing unit to reproduce contents corresponding to the contents reproduced in the external device, based on the received reproduction information.

31 Claims, 7 Drawing Sheets

OTHER PUBLICATIONS

Communication dated Jun. 4, 2012, issued by the European Patent Office in counterpart European Application No. 09153295.2.
Communication dated Jun. 6, 2012, issued by the European Patent Office in counterpart European Application No. 12166883.4.
McElhearn, Kirk, "The complete guide to iPod Audiobooks", May 16, 2005, 8 pages.
Mate, Sujeet et al., "Movable-Multimedia: Session Mobility in Ubiquitous Computing Ecosystem", Dec. 4, 2006, 6 pages.

* cited by examiner

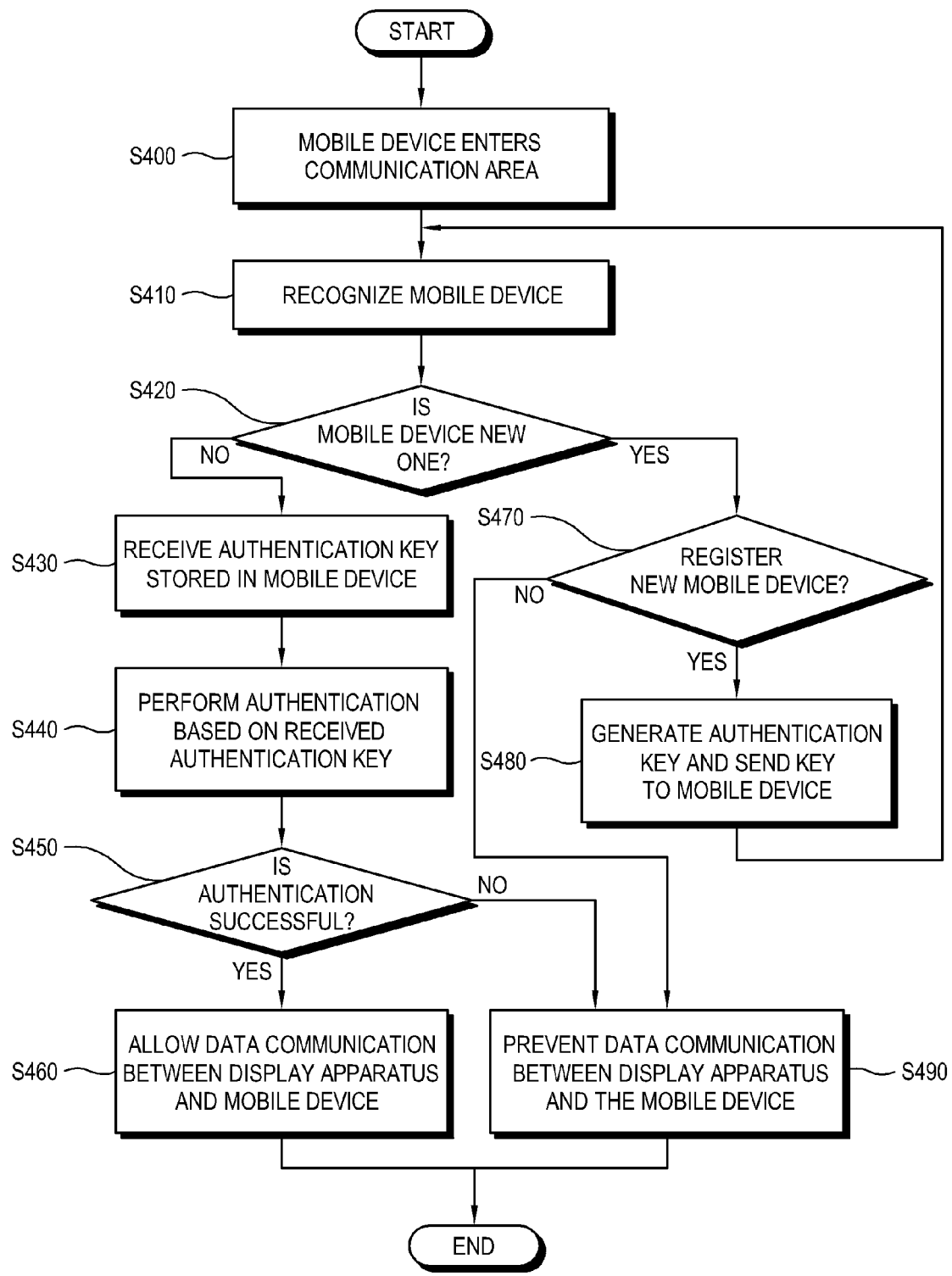

DISPLAY APPARATUS, CONTROL METHOD THEREOF AND CONTROL METHOD OF EXTERNAL DEVICE

CROSS-REFERENCE TO RELATED PATENT APPLICATION

This application claims priority from Korean Patent Application No. 10-2008-0029649, filed on Mar. 31, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to a display apparatus which communicates with an external device and a method thereof, and more particularly to a display apparatus which reproduces contents of the external device and a method thereof.

2. Description of the Related Art

A display apparatus is used as a television (TV), a monitor, and etc. The display apparatus reproduces contents provided by cable or wireless transmission, to be displayed as an image. The display apparatus used as a TV receives an image signal through a cable or antenna, extracts contents from the image signal, and displays the contents. A Portable Media Player (PMP) which is able to reproduce contents is provided and this mobile device downloads digitally filed contents from contents providers or computer stations.

Conventionally, for a user to view the contents stored in a mobile device using a TV, the mobile device is connected with the TV and sends the contents of the mobile device to the TV which reproduces the contents.

There is a case that a user who watches the contents wants to stop reproducing the contents and watch the contents continuously from the same position in the display apparatus. If the display apparatus does not know the last reproduced position, a user must search for is the last reproduced position in the mobile device by himself. For example, the user must search how much time passed since reproduction started.

Conventionally, there is no special restriction to access the display apparatus by the mobile device. It is possible to reproduce contents of unspecified mobile device in the display apparatus. It is possible for unauthenticated contents to be reproduced unintentionally in the display apparatus.

SUMMARY OF THE INVENTION

An aspect of the present invention is to provide a display apparatus which reproduces contents reproduced in an external device continuously from last reproduced position in the external device and a control method thereof.

Another aspect of the present invention is to provide a display apparatus which receives data from an external device selectively through authentication and a control method thereof.

According to an aspect of the invention, there is provided a display apparatus comprising a contents processing unit which reproduces contents, a communication unit which communicates with an external device which reproduces contents, and a control unit which receives reproduction information of contents reproduced in the external device through the communication unit and controls the contents processing unit to reproduce contents corresponding to the contents reproduced in the external device, based on the received reproduction information.

The control unit may control the contents processing unit to reproduce the contents continuously from a last position reproduced in the external device.

The control unit may receive from the external device the contents reproduced in the external device and reproduces the contents reproduced in the external device.

The display apparatus may further comprise a storage unit which stores contents, wherein the control unit controls the contents processing unit to reproduce the contents stored in the storage unit based on the received reproduction information if the storage unit stores same contents as the contents stored in the external device.

The control unit may receive the reproduction information which includes first position information for reproducing the contents reproduced in the external device.

The reproduction information received in the control unit may further comprise at least one of codec information for the contents stored in the external device and order information for reproducing a plurality of the contents stored in the external device.

The display apparatus may further comprise an on-screen display (OSD) generating unit which displays a message of asking whether to reproduce the contents from reproduction position corresponding to the first position information for reproduction, wherein the control unit reproduces the contents from the reproduction position if reproduction of the contents is selected after the message is displayed.

The control unit may generate second position information for reproducing the contents processed in the contents processing unit and send the second position information to the external device for the contents to be reproduced from position which corresponds to second position information in the external device.

The communication unit may communicate with the external device by wireless transmission and the control unit may receive the reproduction information selectively from the external device which enters in a communication possible area of the communication unit.

The display apparatus may further comprise a user input unit which selects whether to reproduce the contents corresponding to the contents in the external device, wherein the control unit controls the contents to be reproduced when the external device enters in the communication possible area if the user input unit selects to reproduce the contents in advance and the control unit does not control the contents to be reproduced when the external device enters in the communication possible area if the user input unit selects not to reproduce the contents in advance.

The display apparatus may further comprise an authentication unit which authenticates the external device which enters in the communication possible area, wherein the control unit receives the reproduction information from the external device which is authenticated by the authentication unit and does not receive the reproduction information from the external device which is not authenticated by the authentication unit.

The authentication unit may receive an authentication key stored in the external device and determines whether to authenticate the external device based on the received key.

The control unit may control the OSD generating unit to generate a message for requesting authentication of the external device if the external device which enters in the communication possible area is not authenticated.

The control unit may generate an authentication key for the external device if the request is accepted and sends the key to the external device.

According to an aspect of the invention, there is provided a control method of a display apparatus comprising receiving reproduction information of contents reproduced in an external device from the external device which reproduces the contents, and reproducing contents corresponding to the contents reproduced in the external device, based on the received reproduction information.

The reproducing contents may comprise reproducing the contents continuously from a last position reproduced in the external device.

The reproducing contents may comprise receiving the contents reproduced in the external device. The reproducing contents may comprise reproducing the contents stored in the display apparatus based on the received reproduction information if the display apparatus stores same contents as the contents stored in the external device.

The receiving reproduction information may comprise receiving the reproduction information which includes first position information for reproducing the contents reproduced in the external device.

The reproduction information further may comprise at least one of codec information for the contents stored in the external device and order information for reproducing a plurality of the contents stored in the external device.

The reproducing contents may comprise displaying a message of asking whether to reproduce the contents from reproduction position corresponding to the first position information for reproduction, and reproducing the contents from the reproduction position if reproduction of the contents is selected.

The reproducing contents may comprise generating second position information for reproducing the contents reproduced in the display apparatus, and sending the second position information to the external device for the contents to be reproduced from position which corresponds to second position information in the external device.

The receiving reproduction information may comprise receiving the reproduction information selectively from the external device which enters in a wireless communication possible area.

The control method may further comprise selecting whether to reproduce the contents corresponding to the contents in the external device before the receiving reproduction information, wherein the receiving reproduction information comprises reproducing the contents when the external device enters in the communication possible area if reproducing the contents is selected in the selecting whether to reproduce the contents and not reproducing the contents when the external device enters in the communication possible area if not reproducing the contents is selected in the selecting whether to reproduce the contents.

The receiving the reproduction information selectively from the external device may comprise determining whether the external device is authenticated, and receiving the reproduction information from the external device if the external device is authenticated and not receiving the reproduction information from the external device if the external device is not authenticated.

The determining whether the external device is authenticated comprises determining whether to authenticate the external device based on an authentication key received from the external device.

The determining whether the external device is authenticated may comprise displaying a message for requesting authentication of the external device if the external device is not authenticated.

The determining whether the external device is authenticated may further comprise generating an authentication key for the external device if the request is accepted, and sending the key to the external device.

A control method of an external device which communicates with a display apparatus may comprise reproducing contents, generating reproduction information of the contents, and sending the reproduction information to the display apparatus for reproducing contents corresponding to the contents reproduced in the external device, based on the reproduction information.

BRIEF DESCRIPTION OF THE DRAWINGS

The above and other aspects and features of the present invention will be apparent from the following detailed description of exemplary embodiments taken in conjunction with the accompanying drawings, in which:

FIG. 7 is a flow chart of authenticating a mobile device in a display apparatus.

DETAILED DESCRIPTION OF EXEMPLARY EMBODIMENTS OF THE INVENTION

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are merely specific details provided to assist those of ordinary skill in the art in a comprehensive understanding of the invention, and the present invention is only defined within the scope of the appended claims.

Figure 1:
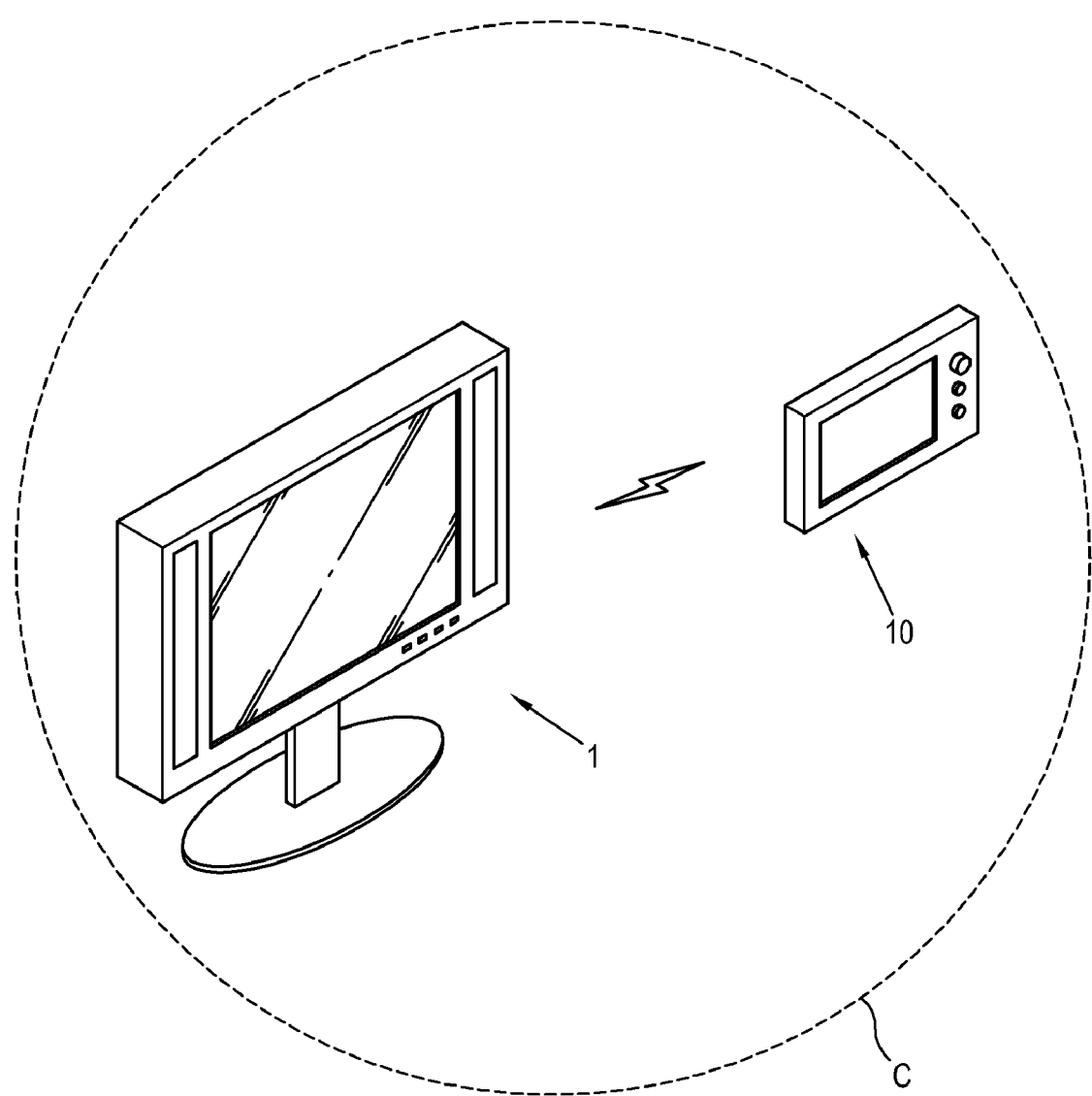
FIG. 1 illustrates a display apparatus and an external device according to an exemplary embodiment of the present invention.

FIG. 1 illustrates a display apparatus 1 and an external device 10 according to an exemplary embodiment of the present invention.

Referring to FIG. 1, the display apparatus 1 receives and reproduces contents from an external image source (not shown). In the exemplary embodiment, the contents include an image and sound, but it is possible for the contents to include only one of an image and sound. The display apparatus 1 may receive the contents from various kinds of image sources, for example, a broadcasting station may provide the contents by a cable or wireless transmission. The display apparatus 1 may communicate with the external device 10 which stores the contents. The external device 10 according to an exemplary embodiment of the present invention may be implemented as a mobile device which a user can carry, but the external device 10 is not limited to the mobile device.

The mobile device 10 is a device which stores and reproduces digitally filed contents and by which a user can enjoy the contents anytime and anywhere. The mobile device 10 may be implemented as a Portable Media Player (PMP), an MP3 player, a portable computer, and etc.

The display apparatus 1 may communicate with the mobile device 10, receive the contents which are stored in the mobile device 10, and reproduce the contents. The display apparatus 1 receives contents reproduction information and reproduces the contents based on the contents reproduction information.

Various kinds of methods may be applied to the communication between the display apparatus 1 and the mobile device 10. The display apparatus 1 according to the exemplary embodiment may wirelessly communicate with the mobile device 10. The communication between the display apparatus 1 and the mobile device 10 is possible if the mobile device 10 enters a communication area C of the display apparatus 1. The communication method is not limited to wireless communication. It is possible for the communication between the display apparatus 1 and the mobile device 10 to be implemented by cable transmission.

The display apparatus 1 may be implemented to communicate only with an authenticated mobile device such as the mobile device 10. In detail, if the display apparatus 1 recognizes that the mobile device 10 enters to the communication area C, the display apparatus 1 attempts to authenticate the mobile device 10. If the display apparatus 1 successfully authenticates the mobile device 10, the display apparatus 1 receives the contents and the content reproduction information from the mobile device 10. If the display apparatus 1 cannot authenticate the mobile device 10, the display apparatus 1 does not receive the contents and the contents reproduction information from the mobile device 10.

Figure 2:
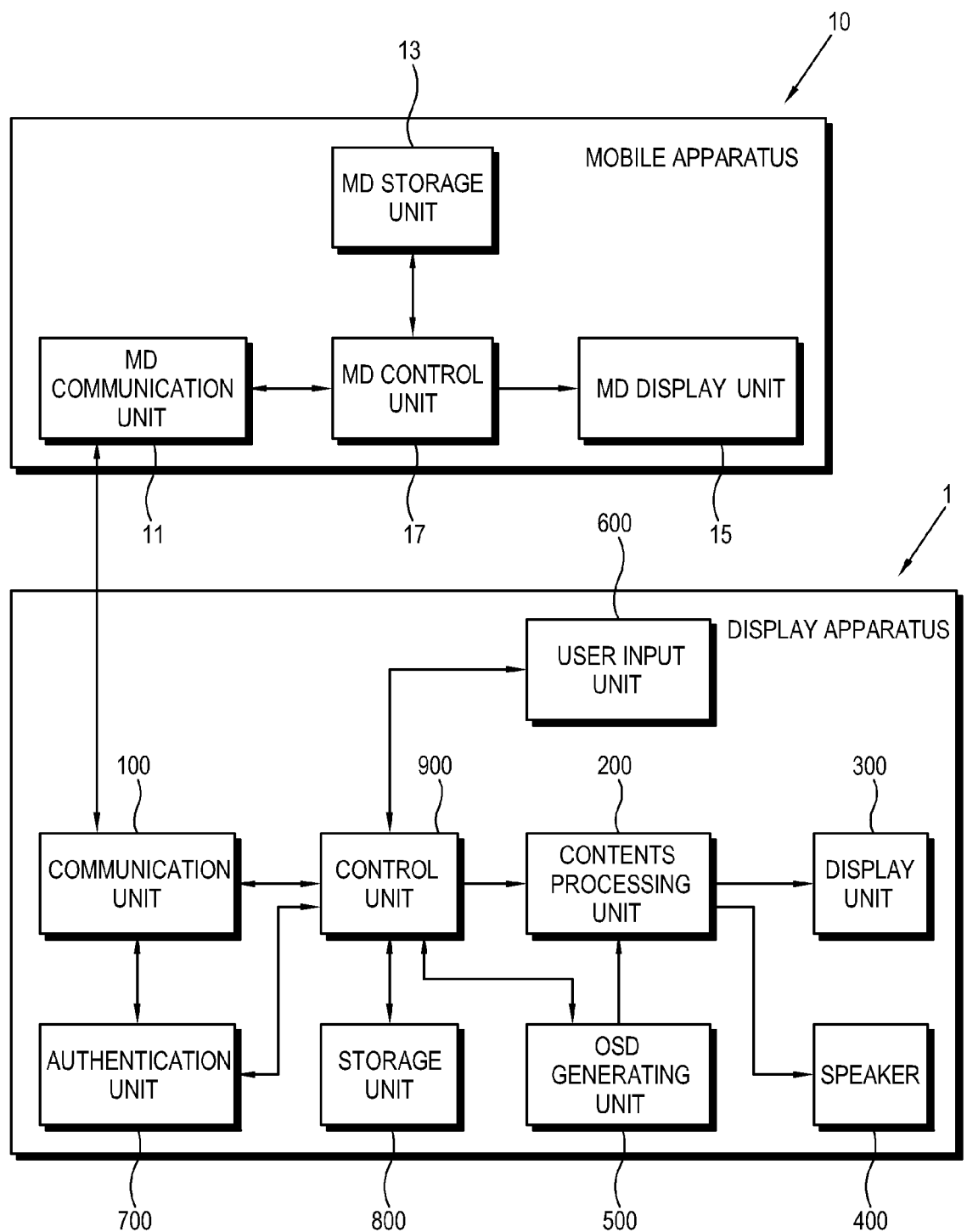
FIG. 2 is a block diagram of a display apparatus and a mobile device according to an exemplary embodiment of the present invention.

Structures of the display apparatus 1 and the mobile device 10 will be explained in detail with reference to FIG. 2. FIG. 2 is a block diagram of the display apparatus 1 and the mobile device 10 according to an exemplary embodiment of the present invention.

The display apparatus 1 comprises a communication unit 100 which communicates with the mobile device 10, contents processing unit 200 which processes the contents received from the mobile device 10 to be reproduced, and a control unit 900 which controls reproduction of the contents based on the content reproduction information received from the mobile device 10.

The display apparatus 1 further comprises a display unit 300 and a speaker 400 which reproduce the processed contents in the contents processing unit 200, an On Screen Display (OSD) generating unit 500 which processes a message to be displayed on the display unit 300, a user input unit 600 through which a user inputs commands, an authentication unit 700 which authenticates the mobile device 10, and a storage unit 800 which stores data such as the contents.

The mobile device 10 comprises a mobile device (MD) communication unit 11 which communicates with the communication unit 100, an MD storage unit 13 which stores the contents, an MD display unit 15 which reproduces the contents, and a control unit 17 which controls the other units.

The communication unit 100 communicates with the mobile device 10 which is in the communication area C and receives the contents and the content reproduction information from the mobile device 10. A wireless communication method such as a Wireless Universal Serial Bus (WUSB) and Bluetooth may be used in the communication unit 100. By utilizing these kinds of wireless communication methods, the mobile device 10 may communicate by entering in the communication area C without being physically connected to the display apparatus 1.

The contents processing unit 200 processes an image of the contents to be displayed on the display unit 300 and a sound of the contents to be output through the speaker 400. The contents processing unit 200 may perform decoding according to a format of the contents, processing for improving image quality, scaling for adjusting a size of the image, display style adjustment according to a request of a user, etc.

The contents processing unit 200 comprises various kinds of codec or decoders and chooses a decoder corresponding to the format of the contents and performs decoding under control of the control unit 900. If there are multiple decoders corresponding to the contents, the contents processing unit 200 may choose a proper decoder. For example, the contents processing unit 200 may choose a decoder which provides most improved image quality.

The display unit 300 displays an image of the contents which is processed by the contents processing unit 200. The display unit 300 may be implemented a plasma display panel (PDP), liquid crystal display (LCD), etc. The speaker 400 outputs the sound processed by the contents processing unit 200.

The OSD generating unit 500 generates messages about user's selections. The messages may be related to selection whether the display apparatus 1 reproduces the contents of the mobile device 10 and whether the display apparatus 1 starts to reproduce the contents from the last reproduced position in the mobile device 10. One of the messages may be related to a request of registration to a user if the mobile device 10 is not registered in the display apparatus 1.

The OSD generating unit 500 generates the messages and outputs the messages to be displayed on the display unit 300. After a user views the messages, the user can select operations of the display apparatus 1 in response to the messages. The OSD generating unit 500 may display a password input window with the messages to prevent an unauthorized user from accessing the display unit 300. In this case, the control unit 900 may perform the user's command only if the password input by a user matches a registered password.

The user input unit 600 is provided for a user to manipulate, and sends the manipulation information input by the user to the control unit 900 for a user to be able to control the display apparatus 1. The user input unit 600 may comprise menu keys provided on the exterior of the display apparatus 1, a remote controller, etc. If a user views the OSD message (P in FIG. 4) and selects one of the choices, the user input unit 600 sends the user's selection information to the control unit 900.

If the mobile device 10 in the communication area C is registered in the display apparatus 1, the authentication unit 700 performs authentication for the mobile device 10. The authentication unit 700 receives an authentication key from the mobile device 10 and determines based on the authentication key whether the mobile device 1 is allowed to communicate.

The authentication unit 700 may be implemented by a micro chip or by a software program. If the authentication unit 700 is implemented by a software program, the control unit 900 may execute the software program.

The storage unit 800 stores the contents to be processed by the contents processing unit 200. If the contents are received from the mobile device 10, the contents are stored in the storage unit 800 to be processed by the contents processing unit 200. The storage unit 800 may be implemented by a hard disc drive, a flash memory, etc.

The control unit 900 receives from the mobile device 10 the contents and the contents reproduction information at that time the mobile device 10 reproduced the contents, through the communication unit 100. The control unit 900 controls the contents processing unit 200 to reproduce the contents received from the mobile device 10.

The contents reproduction information received by the control unit 900 may comprise various kinds of information. For example, the contents reproduction information may comprise position information for reproducing the contents, file route information of the contents stored in the mobile device 10, order information for reproducing a plurality of contents, codec information for reproducing the contents, etc. The control unit 900 may recognize the stored location of the contents using the file route information, control the plurality of contents to be reproduced according to the order information, and determine whether it is possible to reproduce the contents in the contents processing unit 200 based on the codec information.

The control unit 900 receives the position information for reproducing the contents and controls the contents processing unit 200 to reproduce the contents continuously from the last position the contents were reproduced in the mobile device 10.

If a user chooses "YES" as an answer to the message (P) which asks "do you want to reproduce contents of the mobile device continuously from the last reproduced position?", the control unit 900 controls for the contents to be reproduced from the last reproduced position in the mobile device 10.

The control unit 900 may generate position information for reproducing the contents which are processed in the contents processing unit 200 and sends the position information for reproducing the contents to the mobile device 10. In this exemplary embodiment, the contents processed in the contents processing unit 200 are the contents received from the mobile device 10. It is possible for the mobile device 10 to reproduce the contents continuously from the last reproduced position in the display apparatus 1 after the contents are reproduced in the display apparatus 1.

In the case of sending and receiving the contents and the contents reproduction information, the control unit 900 may allow the sending and receiving only to a specified mobile device 10. That is, the control unit 900 may allow the mobile device 10 which is authenticated by the authentication unit 700 to send and receive data, but prevent a mobile device which fails to be authenticated from sending and receiving data.

The control unit 900 controls the OSD generating unit 500 to display a message for requesting authentication to the mobile device 10 if the mobile device 10 is not authenticated. If the request is accepted, the control unit 900 generates an authentication key for the mobile device 10 and sends the key to the mobile device 10. The authentication unit 700 authenticates the mobile device 10 based on the authentication key. If the request is not accepted, the control unit 900 prevents the mobile device 10 from sending and receiving data.

The MD communication unit 11 uses a communication method compatible with the communication unit 100 for the mobile device 10 to communicate with the display apparatus 1.

The MD storage unit 13 stores at least one contents and reproduction information for the contents. It may be desirable for the MD storage unit 13 to be implemented by a nonvolatile memory such as a flash memory for not losing stored data.

The MD display unit 15 displays an image of the contents stored in the MD storage unit 13 and may be implemented by a PDP or an LCD panel. A speaker may be provided for outputting sound.

The MD control unit 17 controls for the contents to be reproduced in the mobile device 10 and stores contents reproduction information, especially the position information of the contents reproduced in the mobile device 10. If the display apparatus 1 requests the contents and the contents reproduction information, the MD control unit 17 sends the requested contents and contents reproduction information via the MD communication unit 11.

Reproduction of the contents from the last reproduced position in the mobile device 10 will be explained with reference to FIGS. 2 and 3.

Figure 3:
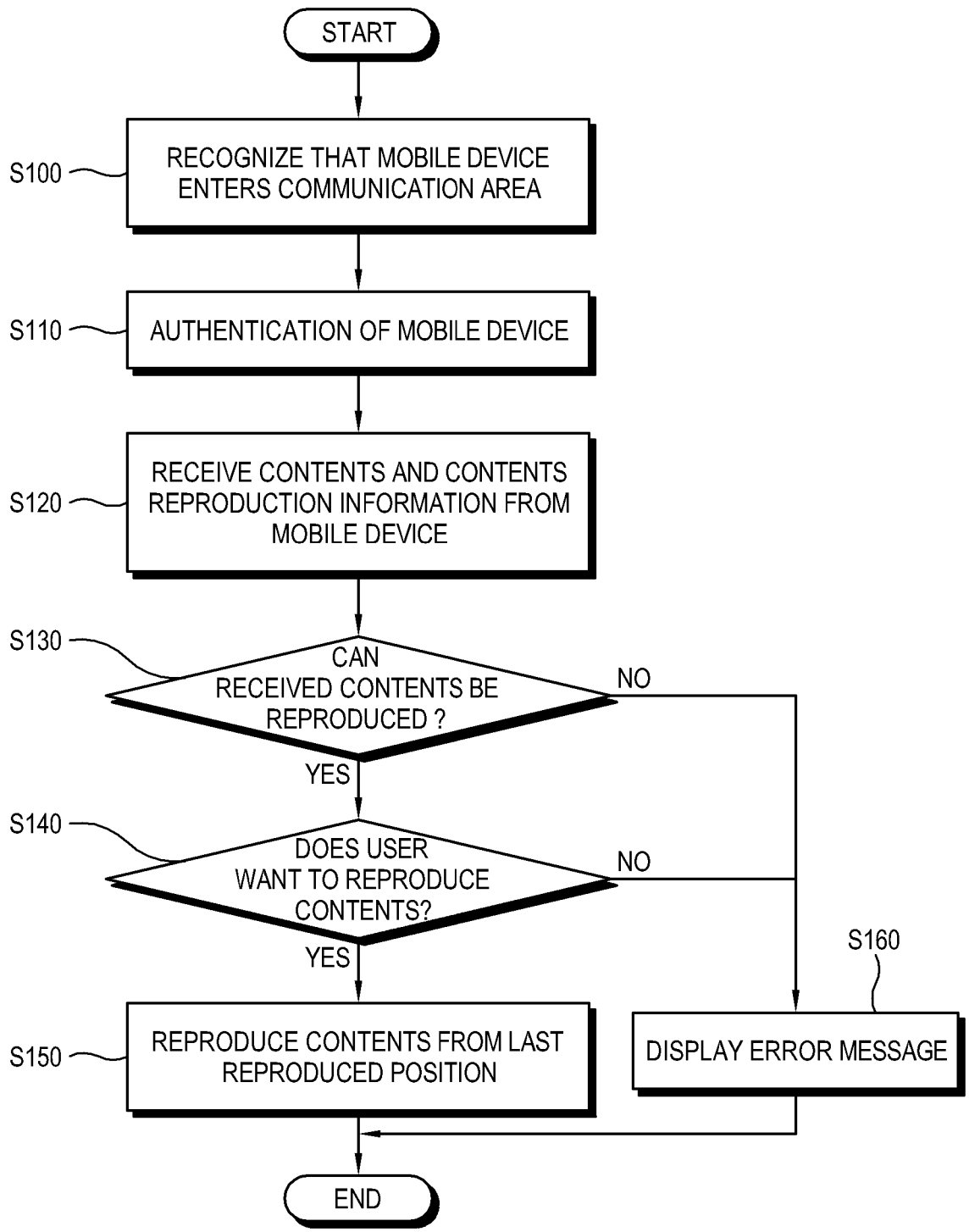
FIG. 3 is a flow chart of contents reproduction operations in a display apparatus based on contents reproduction information in a mobile device.

FIG. 3 is a flow chart of contents reproduction operations in the display apparatus 1 based on the contents reproduction information in the mobile device 10.

The control unit 900 recognizes that the mobile device 10 enters in the communication area (C) (S100). The authentication unit 700 attempts to authenticate the mobile device 10. If the authentication unit 700 successes to authenticate, data transmission between the communication unit 100 and the MD communication unit 11 becomes possible (S110).

The control unit 900 receives the contents and the contents reproduction information from the mobile device 10 (S120). The control unit 900 determines whether the received contents can be processed in the contents processing unit 200, that is, whether the received contents can be reproduced in the display apparatus 1 (S130).

Various methods for determining whether the received contents can be reproduced in the display apparatus 1 can be utilized. For example, the display apparatus 1 determines whether the contents processing unit 200 can decode the received contents using the codec information of the contents which is included in the contents reproduction information or the display apparatus 1 may determine whether the contents can be reproduced by decoding a part of the contents in advance.

Figure 4:
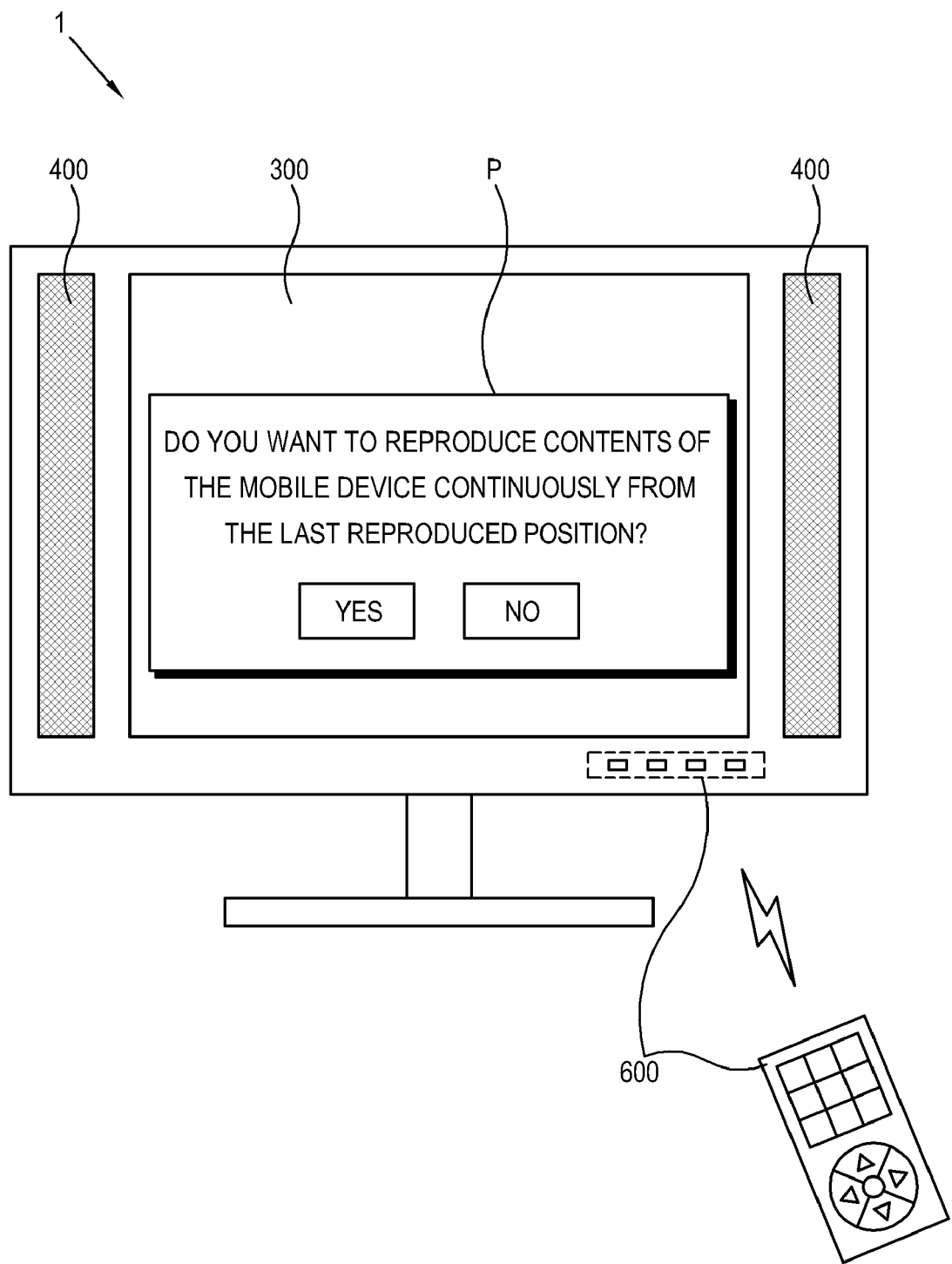
FIG. 4 illustrates an exemplary message whether to reproduce contents of a mobile device in a display apparatus.

If it is determined the contents are decodable, the message that asks "do you want to reproduce contents of the mobile device continuously from the last reproduced position?" is displayed on the display unit 300 by the OSD generating unit 500 (S140) as shown in FIG. 4. If a user chooses "Yes" using the user input unit 600, the control unit 900 causes the contents to be reproduced from the last reproduced position in the mobile device 10 (S150).

If the contents are not decodable in the display apparatus 1 or a user chooses "No" in response to the message of operation S140, the control unit 900 controls the display unit 300 to display an error message (S160). By these operations, the contents which were reproduced in the mobile device 10 may be reproduced in the display apparatus 1 and may be reproduced from the last reproduced position in the mobile device 10.

It is also possible for the contents to be reproduced continuously in the mobile device 10 from the last reproduced position in the display apparatus 1. An exemplary embodiment of this case is explained referring to FIGS. 2, 5, and 6.

Figure 5:
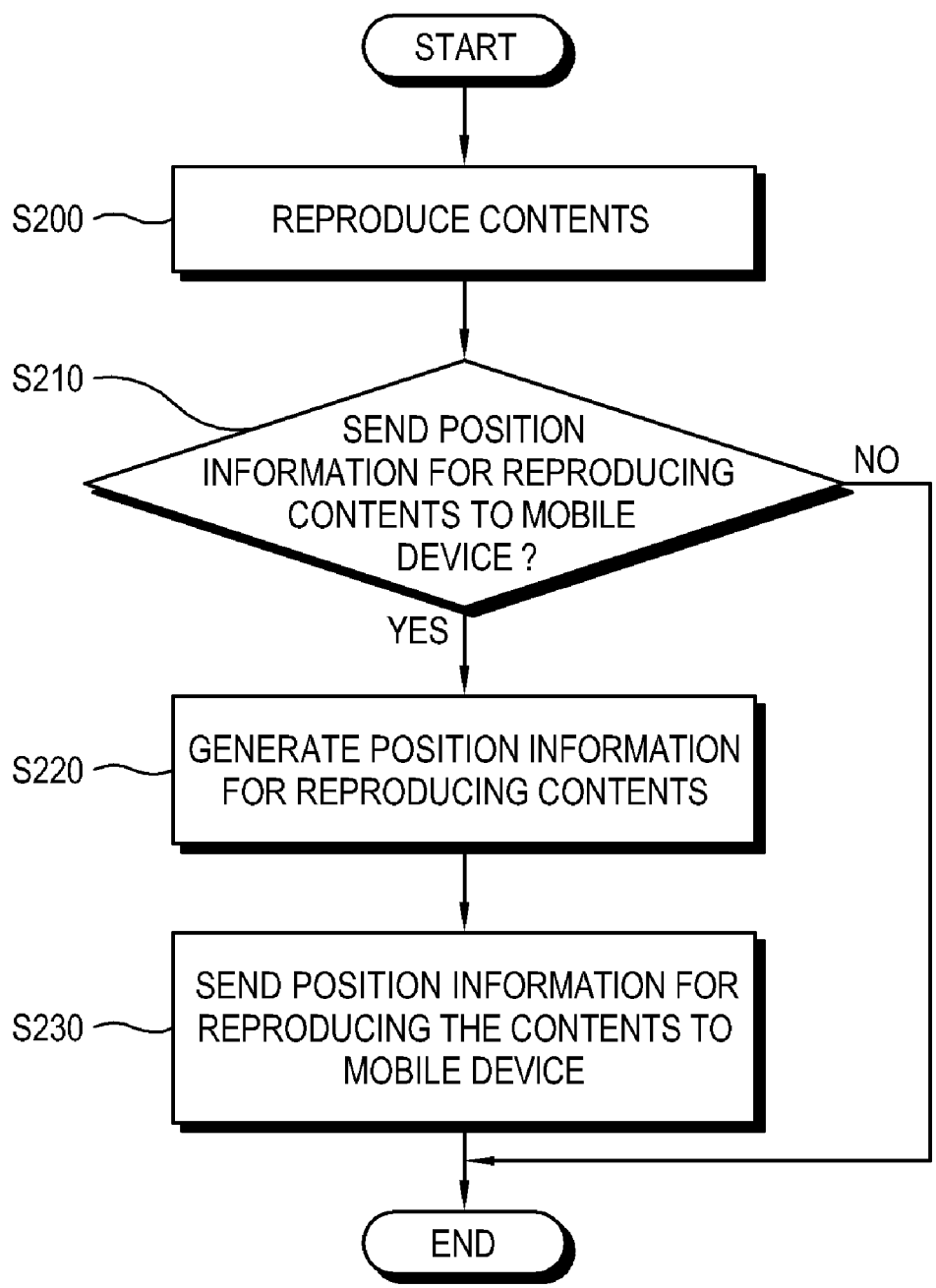
FIG. 5 is a flow chart of operations for sending position information for reproducing contents which is reproduced in a display apparatus to a mobile device.

FIG. 5 is a flow chart of operations for sending the position information for reproducing the contents which is reproduced in the display apparatus 1 to the mobile device 10.

Referring to FIG. 5, the control unit 900 controls the contents processing unit 200 to reproduce the contents (S200). The contents may be received from the mobile device 10 or may be received from sources other than the mobile device 10.

A user chooses whether to send the position information for reproducing the contents to the mobile device 10 through the user input unit 600 (S210).

If a user chooses to send the position information, the control unit 900 generates position information for reproducing the contents (S220) and sends the position information to the mobile device 10 through the communication unit 100 (S230). After sending the position information for reproducing the contents is finished, the control unit 900 may store or delete the position information for reproducing the contents in the storage unit 800.

Figure 6:
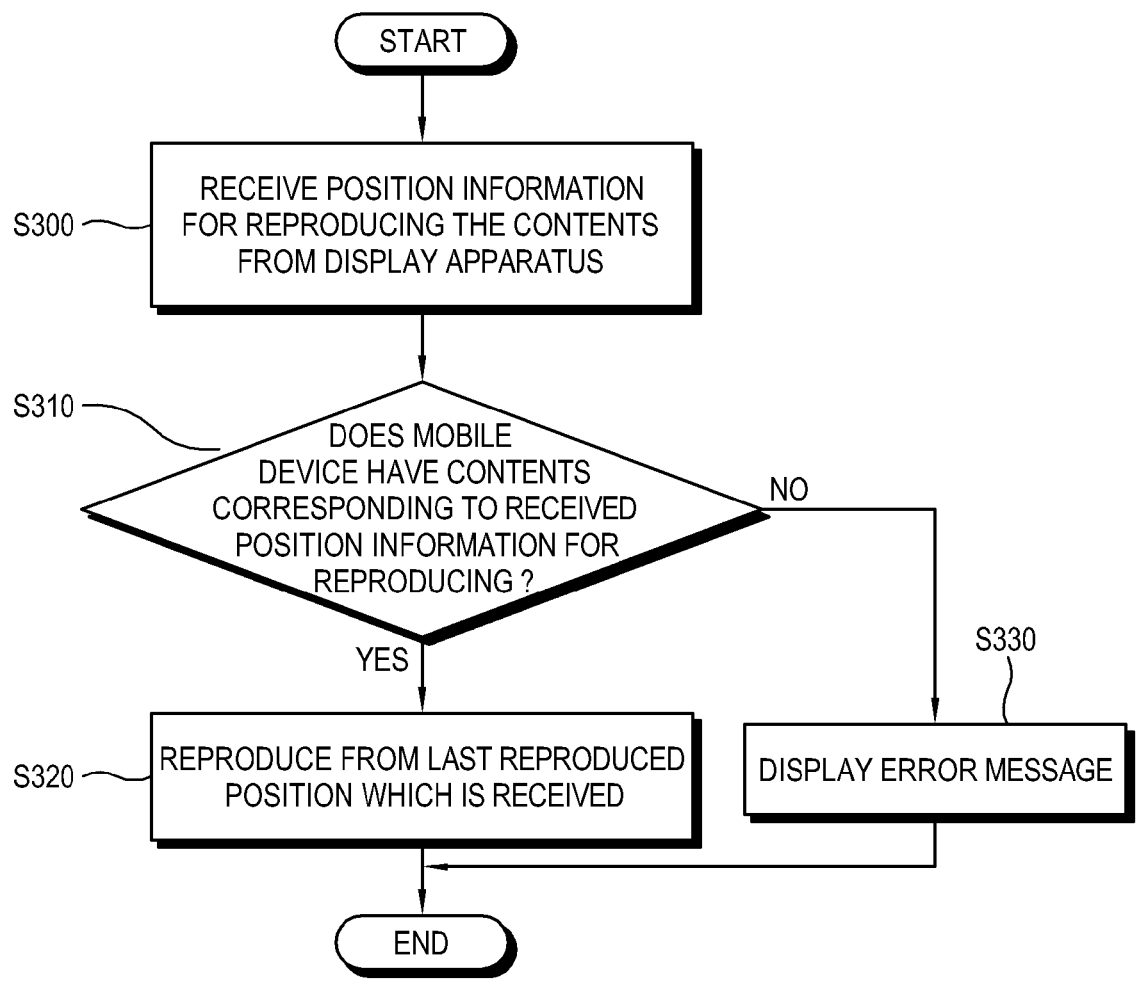
FIG. 6 is a flow chart of operations for reproducing contents in a mobile device based on position information for reproducing contents received from a display apparatus.

FIG. 6 is a flow chart of operations for reproducing the contents in the mobile device 10 based on the position information for reproducing the contents received from the display apparatus 1.

If the position information for reproducing the contents is received from the display apparatus 1, the MD control unit 17 stores the position information for reproducing the contents in the MD storage unit 13 (S300). The MD control unit 17 checks whether the mobile device 10 has the contents corresponding to the received position information for reproducing (S310), when the MD control unit 17 tries to reproduce the corresponding contents in the mobile device 10.

If there are the corresponding contents, the MD control unit 17 causes the contents to be reproduced continuously from the last reproduced position which is received (S320). If there are no corresponding contents, the MD control unit 17 causes an error message to be displayed (S330).

By this process, it becomes possible to reproduce the contents continuously from the last reproduced position in the display apparatus 1, in the mobile device 10.

If the contents sent to the mobile device 10 are the contents which were sent to the display apparatus 1 from the mobile device 10, the mobile device 10 already has the contents. In this case, the position information for reproducing the contents is sent from the display apparatus 1 to the mobile device 10, but the contents do not need to be sent.

Processes for authenticating the mobile device 10 which enters in the communication possible area (C) and allowing to receive and send data and processes for registering the mobile device 10 which is not registered in the display apparatus 1 are explained referring to FIGS. 2 and 7.

FIG. 7 is a flow chart of authenticating the mobile device 10 in the display apparatus 1.

Referring to FIG. 7, if the mobile device 10 enters in the communication possible area (C) S400, the control unit 900 recognizes the mobile device 10 (S410). The control unit 900 determines whether the recognized mobile device 10 is a new device which is not registered in the display apparatus 1 (S420).

There are various methods for the control unit 900 to determine whether the recognized mobile device 10 is a new device. For example, a method for reading device information of the mobile device 10 and checking whether there is corresponding information stored in the storage unit 800 of the display apparatus 1 or a method for determining based on whether an authentication key is stored in the mobile device 10 are possible.

If the recognized mobile device 10 is not a new device, that is, if the recognized mobile device 10 is registered already, the control unit 900 receives an authentication key stored in the mobile device 10 (S430). The authentication key is generated and given to the mobile device 10 at the time when the mobile device 10 is registered first.

The authentication unit 700 performs authentication based on the received authentication key (S440). The control unit 900 determines whether the authentication by the authentication unit 700 is successful (S450).

If the authentication is successful, the control unit 900 allows data communication between the display apparatus 1 and the mobile device 10 (S460) so that the contents and the contents reproduction information in the mobile device 10 may be sent to the display apparatus 1.

If the authentication is not successful, the control unit 900 prevents data communication between the display apparatus 1 and the mobile device 10 (S490).

If the mobile device 10 is determined as a new device which is not registered in the display apparatus 1, the control unit 900 controls the OSD generating unit 500 to display a message for asking to register the new mobile device 10 on the display unit 300 (S470).

If a user does not agree to register the new mobile device 10, the control unit 900 prevents data communication between the display apparatus 1 and the mobile device 10 (S490). In particular, if a user agrees to register the new mobile device 10, the control unit 900 generates an authentication key for the mobile device 10 and sends the key to the mobile device 10 (S480). The sent authentication key is stored in the mobile device 10. The authentication key is sent to the display apparatus 1 again when the authentication unit 700 performs authentication.

After the authentication key is sent, the control unit 900 recognizes the mobile device 10 again and performs authentication.

By the authentication of the mobile device 10 by the display apparatus 1, an unspecified mobile device 10 may be prevented from receiving and sending data to the display apparatus 1.

The above exemplary embodiments are directed to a case that display apparatus 1 receives the contents and the contents reproduction information together, but the present invention is not limited to this case. For example, the contents corresponding to the contents stored in the MD storage unit 13, that is, substantially same contents, may be stored in the storage unit 800. In this case, the contents are stored in both of the display apparatus 1 and the mobile device 10. In this case, if the display apparatus 1 reproduces the contents, it is possible to receive from the mobile device 10 only the position information for reproducing the contents without the contents. Alternatively, it is possible to receive the contents from an external device which is connected to the display apparatus 1 and the reproduction information corresponding to the contents from the mobile device 10.

There are various kinds of methods for registering and authenticating a new mobile device 10. For example, in operation S480 of FIG. 7 in which the control unit 900 generates an authentication key and sends the key to the mobile device 10, the control unit 900 may generate a couple of authentication keys which correspond to each other. The display apparatus 1 and the mobile device 10 may store respective authentication keys. In the authentication operations S430 and S440 of the authentication unit 700, the control unit 900 may match the authentication key of the recognized mobile device 10 and the authentication key of the display apparatus 1. If the keys are matched, the authentication is considered successful. However, the present invention is not limited to this example of an authentication process.

A user may select whether the display apparatus 1 reproduces the contents continuously from the last position reproduced in the mobile device 10. If a user selects for the display apparatus 1 to reproduce the contents continuously from the last position reproduced in the mobile device 10, it is possible for the contents of the mobile device 10 to be reproduced in the display apparatus 1 continuously from the last position reproduced in the mobile device 10.

Referring to FIGS. 1 and 2, a user may select whether the display apparatus 1 reproduces the contents continuously from the last position reproduced in the mobile device 10 or display apparatus 1 do not reproduce the contents in advance. The user's selection may be stored in the storage unit 800 for the control unit 900 to refer.

If the mobile device 10 enters in the communication possible area (C), the control unit 900 may search the user's selection stored in the storage unit 800 already.

If the user's selection is to reproduce the contents from the last position reproduced in the mobile device 10, the control unit 900 performs authentication of the mobile device 10 and reproduction of the contents like the above exemplary embodiments.

If the user's selection is not to reproduce the contents, the control unit 900 does not perform authentication of the mobile device 10 or reproduction of the contents even if the control unit 900 recognizes the mobile device 10. Even if the mobile device 10 enters in the communication possible area (C) during a contents is reproduced in the display apparatus 1, the display apparatus 1 does not display the message (P) of FIG. 4. It may prevent the message of FIG. 4 from displaying and the contents of the mobile device 10 from being reproduced unintentionally during a user watches contents of the display apparatus 1.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A display apparatus comprising:
    a communication unit which receives contents and reproduction information from a mobile device external to the display apparatus, wherein the reproduction information identifies contents which were previously displayed on the mobile device;
    a contents processing unit which reproduces the contents from the mobile device and displays the contents on a display unit of the display apparatus; and
    a control unit which receives the reproduction information from the communication unit and controls the contents processing unit to reproduce the contents which were previously displayed on the mobile device on the display apparatus,
    wherein the control unit controls the contents processing unit based on the reproduction information to reproduce the contents continuously from a last position that the contents were displayed on the mobile device,
    wherein the reproduction information comprises first position information for reproducing the contents reproduced in the mobile device, and
    wherein the control unit generates second position information for reproducing the contents processed in the contents processing unit and sends the second position information to the mobile device for the contents to be reproduced on the mobile device from a position which corresponds to the second position information.

2. The display apparatus of claim 1, wherein the control unit receives from the mobile device the contents previously displayed on the mobile device and reproduces the contents previously displayed on the mobile device on the display unit of the display apparatus.

3. The display apparatus of claim 1, further comprising a storage unit which stores contents, wherein the control unit controls the contents processing unit to reproduce the contents stored in the storage unit based on the received reproduction information if the contents stored in the storage unit are the same as the contents stored in the mobile device.

4. The display apparatus of claim 1, wherein the reproduction information further comprises codec information for the contents stored in the mobile device and order information for reproducing a plurality of the contents stored in the mobile device.

5. The display apparatus of claim 1, further comprising
    an on screen display (OSD) generating unit which displays a message of requesting whether to reproduce the contents from a reproduction position corresponding to the first position information,
    wherein the control unit controls the contents processing unit to reproduce the contents from the reproduction position if reproduction of the contents is selected in response to the message which is displayed.

6. The display apparatus of claim 1, wherein the communication unit communicates with the mobile device by wireless transmission and the control unit receives the reproduction information selectively from the mobile device which enters in a communication area of the communication unit.

7. A display apparatus comprising:
    a communication unit which receives contents and reproduction information from a mobile device external to the display apparatus, wherein the reproduction information identifies contents which were previously displayed on the mobile device;
    a contents processing unit which reproduces the contents from the mobile device and displays the contents on a display unit of the display apparatus; and
    a control unit which receives the reproduction information from the communication unit and controls the contents processing unit to reproduce the contents which were previously displayed on the mobile device on the display apparatus,
    wherein the control unit controls the contents processing unit based on the reproduction information to reproduce the contents continuously from a last position that the contents were displayed on the mobile device,
    wherein the communication unit communicates with the mobile device by wireless transmission and the control unit receives the reproduction information selectively from the mobile device which enters in a communication area of the communication unit,
    wherein the display apparatus further comprises: a user input unit through which a user selects whether to reproduce the contents on the display apparatus which were previously displayed on the mobile device, and
    wherein the control unit controls the contents processing unit to reproduce the contents when the mobile device enters in the communication area if it is selected to reproduce the contents via the user input unit in advance, and the control unit does not control the contents processing unit to reproduce the contents when the mobile device enters in the communication area if it is selected not to reproduce the contents via the user input unit in advance.

8. The display apparatus of claim 6, further comprising
    an authentication unit which authenticates the mobile device which enters in the communication area,
    wherein the control unit receives the reproduction information from the mobile device which is authenticated by the authentication unit and does not receive the reproduction information from the mobile device which is not authenticated by the authentication unit.

9. The display apparatus of claim 8, wherein the authentication unit receives an authentication key stored in the mobile device and determines whether to authenticate the mobile device based on the received authentication key.

10. The display apparatus of claim 8, wherein the control unit controls the OSD generating unit to generate a message for requesting authentication of the mobile device if the mobile device which enters in the communication area is not authenticated.

11. The display apparatus of claim 10, wherein the control unit generates an authentication key for the mobile device if the request is accepted and sends the key to the mobile device.

12. A control method of a display apparatus comprising:
receiving reproduction information from a mobile device external to the display apparatus, wherein the reproduction information identifies contents which were previously displayed on the mobile device; and
reproducing the contents on the display apparatus which were previously displayed on the mobile device, based on the received reproduction information,
wherein the reproduction information comprises first position information for reproducing the contents reproduced in the mobile device, and
wherein the reproducing contents comprises:
generating second position information for reproducing the contents reproduced in the display apparatus; and
sending the second position information to the mobile device for the contents to be reproduced on the mobile device from a position which corresponds to the second position information.

13. The control method of claim 12, wherein the reproducing contents on the display apparatus comprises reproducing the contents continuously from a last position that the contents were displayed on the mobile device.

14. The control method of claim 13, wherein the reproducing contents comprises receiving the contents at the display apparatus that were previously displayed on the mobile device.

15. The control method of claim 13, wherein the reproducing contents comprises reproducing the contents stored in the display apparatus based on the received reproduction information if the contents stored in the display apparatus stores are the same as the contents stored in the mobile device.

16. The control method of claim 12, wherein the reproduction information further comprises at least one of codec information for the contents stored in the mobile device and order information for reproducing a plurality of the contents stored in the mobile device.

17. The control method of claim 12, wherein the reproducing contents comprises:
displaying a message of requesting whether to reproduce the contents from a reproduction position corresponding to the first position information; and
reproducing the contents from the reproduction position if reproduction of the contents is selected in response to the message which is displayed.

18. The control method of claim 12, wherein the receiving reproduction information comprises receiving the reproduction information selectively from the mobile device which enters in a wireless communication area of the display.

19. A control method of a display apparatus comprising:
receiving reproduction information from a mobile device external to the display apparatus, wherein the reproduction information identifies contents which were previously displayed on the mobile device; and
reproducing the contents on the display apparatus which were previously displayed on the mobile device, based on the received reproduction information,
wherein the receiving reproduction information comprises receiving the reproduction information selectively from the mobile device which enters in a wireless communication area of the display, and
wherein the control method further comprises selecting whether to reproduce the contents on the display apparatus which were previously displayed on the mobile device before the receiving the reproduction information, and
wherein the receiving reproduction information comprises reproducing the contents when the mobile device enters in the communication area if reproducing the contents is selected in the selecting whether to reproduce the contents; and not reproducing the contents when the mobile device enters in the communication area if not reproducing the contents is selected in the selecting whether to reproduce the contents.

20. The control method of claim 18, wherein the receiving the reproduction information selectively from the mobile device comprises:
determining whether the mobile device is authenticated; and
receiving the reproduction information from the mobile device if the mobile device is authenticated; and not receiving the reproduction information from the mobile device if the mobile device is not authenticated.

21. The control method of claim 20, wherein the determining whether the mobile device is authenticated comprises determining whether to authenticate the mobile device based on an authentication key received from the mobile device.

22. The control method of claim 20, wherein the determining whether the mobile device is authenticated comprises displaying a message for requesting authentication of the mobile device if the mobile device is not authenticated.

23. The control method of claim 22, wherein the determining whether the mobile device is authenticated further comprises:
generating an authentication key for the mobile device if the request is accepted; and
sending the authentication key to the mobile device.

24. A control method of a mobile device which communicates with a display apparatus comprising:
displaying contents on the mobile device;
generating reproduction information of the contents displayed on the mobile device which identifies the contents which were displayed on the mobile device; and
sending the contents and the reproduction information from the mobile device to the display apparatus for reproducing the contents which were displayed on the mobile device on the display apparatus,
wherein the control method further comprises processing by the display apparatus the contents received from the mobile device, the processing comprises adjusting the contents displayed by the mobile device to the display by the display apparatus,
wherein the processing comprises selecting a decoder from a plurality of the decoders, which decodes a format corresponding to the format of the contents displayed by the mobile device, and
wherein the decoder is further selected based on whether the decoder provides an improved image quality.

25. The display apparatus of claim 1, wherein the communication unit receives together the contents and the reproduction information.

26. The display apparatus of claim 1, wherein the content processing unit reproduces the contents stored in the mobile device based on the reproduction information.

27. The display apparatus of claim 26, wherein the reproduction information comprises at least one of file route information for locating on the mobile device files comprising the contents, order information for reproducing the contents, and codec information for reproducing the contents.

28. The method of claim 12, wherein the contents are stored in both the mobile device and the display apparatus.

29. The method of claim 24, further comprising the display apparatus searching user predefined settings stored in the mobile device, wherein if the mobile device is within a vicinity of the display apparatus, determining whether to switch displaying the contents from the mobile device to the display apparatus based on the user predefined settings, and automatically switching the displaying of the contents if the user predefined settings request said switch.

30. The method of claim 24, wherein the mobile device is within the vicinity of the display apparatus if the mobile device is connected via cable to the display apparatus or if the mobile device enters a communication area in which the mobile device is able to communicate with the display apparatus wirelessly.

31. The method of claim 24, wherein the processing comprises at least one of improving image quality of the contents, scaling for adjusting a size of the contents, and display style adjustment.

\* \* \* \* \*